United States Patent
Nara et al.

(10) Patent No.: US 9,613,593 B2
(45) Date of Patent: Apr. 4, 2017

(54) DISPLAY DEVICE

(71) Applicant: Clarion Co., Ltd., Saitama-shi, Saitama (JP)

(72) Inventors: Norikazu Nara, Tokyo (JP); Katsuya Matsuyuki, Saitama (JP); Noriyuki Abe, Yokohama (JP)

(73) Assignee: Clarion Co., Ltd., Saitama-shi, Saitama (JP)

( * ) Notice: Subject to any disclaimer, the term of this patent is extended or adjusted under 35 U.S.C. 154(b) by 0 days.

(21) Appl. No.: 14/406,055

(22) PCT Filed: Jun. 7, 2013

(86) PCT No.: PCT/JP2013/065849
§ 371 (c)(1),
(2) Date: Dec. 5, 2014

(87) PCT Pub. No.: WO2013/183765
PCT Pub. Date: Dec. 12, 2013

(65) Prior Publication Data
US 2015/0154728 A1 Jun. 4, 2015

(30) Foreign Application Priority Data
Jun. 8, 2012 (JP) ................. 2012-130929

(51) Int. Cl.
*G09G 5/12* (2006.01)
*G06F 3/14* (2006.01)
(Continued)

(52) U.S. Cl.
CPC ............... *G09G 5/12* (2013.01); *G06F 3/038* (2013.01); *G06F 3/0416* (2013.01);
(Continued)

(58) Field of Classification Search
CPC .. G06F 3/1454; G06F 3/1462; G06F 3/03547; G06F 3/0488; G06F 2203/0383;
(Continued)

(56) References Cited

U.S. PATENT DOCUMENTS

| 7,970,436 B1 | 6/2011 | Katzer et al. | |
| 8,694,177 B2* | 4/2014 | Quinn | B60K 35/00 701/2 |

(Continued)

FOREIGN PATENT DOCUMENTS

| CN | 1402116 A | 3/2003 |
| CN | 101211244 A | 7/2008 |

(Continued)

OTHER PUBLICATIONS

Supplementary Partial European Search Report for corresponding EP Application No. EP 13789850, dated Jan. 7, 2016 with English translation (eight (8) pages).

(Continued)

*Primary Examiner* — Sanjiv D Patel
(74) *Attorney, Agent, or Firm* — Crowell & Moring LLP

(57) ABSTRACT

A display device that is to be connected with an information terminal includes: a video reception unit that receives video information about a screen including a cursor from the information terminal; a touch panel that brings up on display the screen based upon the video information received by the video reception unit and detects a touch position specified by a touch operation; and a transmission unit that transmits, to the information terminal, displacement quantity information corresponding to a quantity of displacement from the display position of the cursor to the touch position.

6 Claims, 5 Drawing Sheets

(51) Int. Cl.
  *G06F 3/0488* (2013.01)
  *H04M 1/725* (2006.01)
  *G06F 3/038* (2013.01)
  *G06F 3/041* (2006.01)
  *G06T 1/20* (2006.01)

(52) U.S. Cl.
  CPC .......... *G06F 3/0488* (2013.01); *G06F 3/1415* (2013.01); *G06T 1/20* (2013.01); *H04M 1/7253* (2013.01); *B60K 2350/1028* (2013.01); *B60K 2350/1068* (2013.01); *B60K 2350/357* (2013.01); *G06F 3/1454* (2013.01); *G06F 2203/0383* (2013.01); *G09G 2380/10* (2013.01); *H04M 2250/22* (2013.01)

(58) Field of Classification Search
  CPC .... G06F 3/0416; G06F 3/0436; G06F 3/0412; G06F 3/01; G06F 3/1446; G06F 3/04883; G06F 3/0236; B60K 2350/1024; B60K 2350/1028; B60K 2350/1068; G09G 2340/0492; G09G 2370/16; G09G 5/14; H04M 1/72527; H04M 2250/22
  See application file for complete search history.

(56) References Cited

U.S. PATENT DOCUMENTS

| | | | | |
|---|---|---|---|---|
| 2002/0032699 | A1* | 3/2002 | Edwards | G06F 17/30899 715/207 |
| 2003/0025678 | A1* | 2/2003 | Lee | G06F 3/0488 345/173 |
| 2007/0002027 | A1* | 1/2007 | Lii | G06F 3/038 345/173 |
| 2008/0133084 | A1* | 6/2008 | Weinmann | H04M 1/6083 701/36 |
| 2008/0158152 | A1 | 7/2008 | Parker | |
| 2008/0211780 | A1* | 9/2008 | Bell | G06F 1/1613 345/173 |
| 2009/0195513 | A1* | 8/2009 | Dybalski | G06F 3/0488 345/173 |
| 2010/0259491 | A1 | 10/2010 | Rajamani et al. | |
| 2011/0128446 | A1 | 6/2011 | Woo | |
| 2011/0191723 | A1* | 8/2011 | Wu | G06F 3/04883 715/856 |
| 2011/0227843 | A1 | 9/2011 | Wang | |
| 2011/0292282 | A1* | 12/2011 | Isozu | H04M 1/72533 348/563 |
| 2011/0307843 | A1* | 12/2011 | Miyazaki | G06F 3/0486 715/863 |
| 2012/0075204 | A1* | 3/2012 | Murray | G06F 3/0416 345/173 |
| 2012/0287446 | A1* | 11/2012 | Matsumura | G06K 15/005 358/1.6 |
| 2012/0299846 | A1 | 11/2012 | Matsuda | |
| 2013/0120251 | A1* | 5/2013 | Lee | G06F 3/1438 345/157 |

FOREIGN PATENT DOCUMENTS

| | | |
|---|---|---|
| CN | 102439953 A | 5/2012 |
| JP | 2003-244343 A | 8/2003 |
| JP | 2011-259259 A | 12/2011 |
| JP | 2012-18587 A | 1/2012 |
| JP | 2013-33303 A | 2/2013 |
| WO | WO 2010/120878 A2 | 10/2010 |

OTHER PUBLICATIONS

International Search Report dated Aug. 27, 2013 with English translation (three (3) pages).
Supplementary European Search Report for corresponding EP Application No. EP 13799850, dated Jun. 8, 2016 (fourteen (14) pages).
Chinese-language Office Action issued in counterpart Chinese Application No. 201380030082.8 dated Jul. 4, 2016 with English translation (Seventeen (17) pages).
Japanese-language Office Action issued in counterpart Japanese Application No. 2012-130929 dated Sep. 20, 2016 with English translation (Nine (9) pages).

* cited by examiner

FIG.4
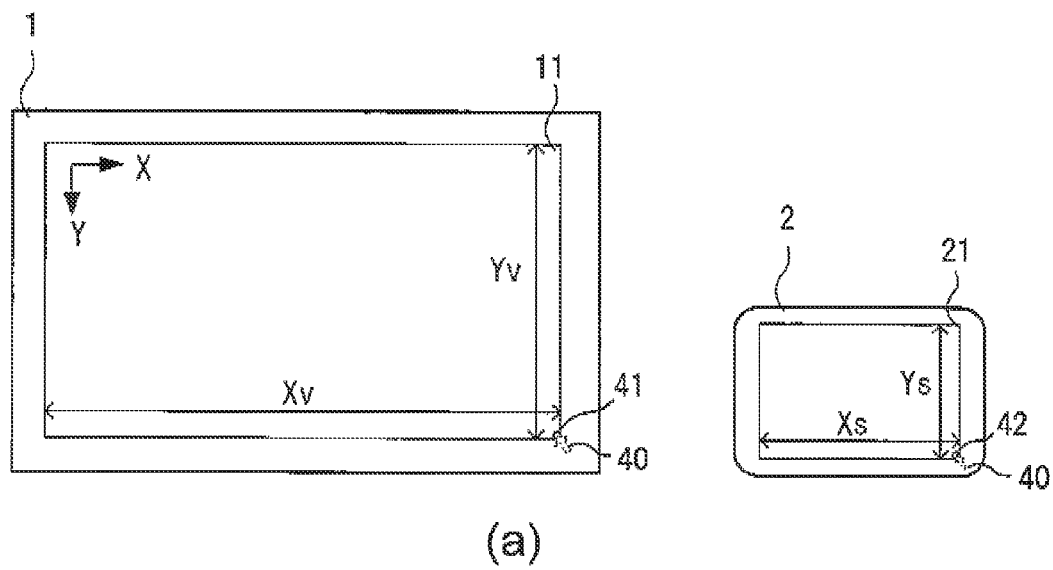
(a)
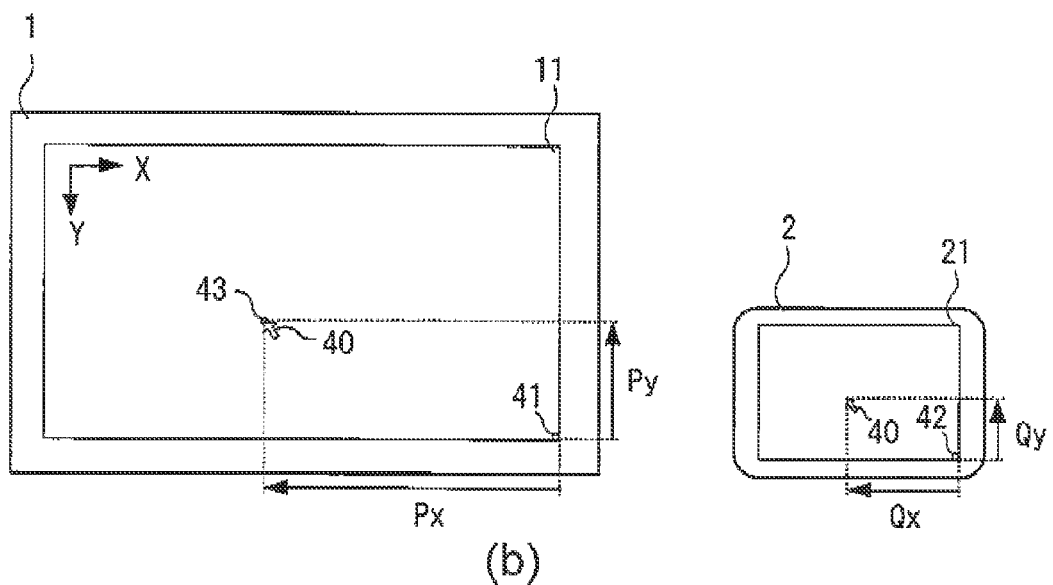
(b)

DISPLAY DEVICE

TECHNICAL FIELD

The present invention relates to a display device.

BACKGROUND ART

There has been known in the related art a technology which makes it possible to bring up on display a display screen of a portable phone and a plurality of touch switches corresponding to respective operation keys of the portable phone on the display of an in-vehicle device and operate, when any particular touch switch among the touch switches is operated, the portable phone by providing an operation command for an operation key that corresponds to the particular touch switch from the in-vehicle device to the portable phone (see Patent Literature 1).

CITATION LIST

Patent Literature

Patent Literature 1: Japanese Laid Open Patent Publication No. 2003-244343

SUMMARY OF INVENTION

Technical Problem

In recent years, in addition to conventional portable phones in which operations are performed by using operation keys, smartphones that enable intuitive operations by using a touch panel are widely used. It is impossible to achieve operations of such smartphones, through the in-vehicle device according to the conventional technology as described in the patent literature 1. As stated above, conventionally, there has been proposed no technology for operating an information terminal, such as a smartphone, in which a touch panel input operation method is adopted, through a display device when it brings up on display a display screen of the information terminal thereon.

Solution to Problem

A display device according to a first aspect of the present invention is to be connected with an information terminal and it includes: a video reception unit that receives video information about a screen including a cursor from the information terminal; a touch panel that brings up on display the screen based upon the video information received by the video reception unit and detects a touch position specified by a touch operation; and a transmission unit that transmits, to the information terminal, displacement quantity information corresponding to a quantity of displacement from the display position of the cursor to the touch position.

According to a second aspect of the present invention, in the display device of the first aspect, it is preferred that the transmission unit additionally transmits button operation information indicating that a predetermined button operation has been performed to the information terminal.

According to a third aspect of the present invention, in the display device of the second aspect, it is preferred that, if the touch operation is completed within a predetermined period of time with the touch position being unchanged, the transmission unit transmits, after having transmitted the displacement quantity information in correspondence to the quantity of displacement from the display position of the cursor to the touch position, the button operation information along with displacement quantity information indicating that the quantity of displacement is 0.

According to a fourth aspect of the present invention, in the display device of the second or third aspect, it is preferred that, if the touch operation is performed a plurality of times with the touch position being unchanged, the transmission unit transmits, after having transmitted the displacement quantity information in correspondence to the quantity of displacement from the display position of the cursor to the touch position, the button operation information a plurality of times along with the displacement quantity information indicating that the quantity of displacement is 0.

According to a fifth aspect of the present invention, in the display device of any one of the second through fourth aspects, it is preferred that, if the touch position is changed while the touch operation is going on, the transmission unit transmits, after having transmitted the displacement quantity information in correspondence to the quantity of displacement from the display position of the cursor to the touch position, the button operation information along with the displacement quantity information indicating a quantity of displacement in correspondence to a change in the touch position while the touch operation is going on, and after the touch operation is completed, transmits displacement quantity information indicating that the quantity of displacement is 0.

According to a sixth aspect of the present invention, in the display device of any one of the second through fifth aspects, it is preferred that, if the touch operation is going on for a predetermined period of time or longer with the touch position being unchanged, the transmission unit transmits, after having transmitted the displacement quantity information in correspondence to the quantity of displacement from the display position of the cursor to the touch position, the button operation information along with displacement quantity information indicating that the quantity of displacement is 0 while the touch operation is going on.

According to a seventh aspect of the present invention, in the display device of any one of the first through sixth aspects, it is preferred that the transmission unit transmits the displacement quantity information by using a communication format for a mouse in Bluetooth or USB.

A display device according to an eighth aspect of the present invention is to be connected with an information terminal having a display monitor and it includes: a video reception unit that receives video information about a screen including a cursor from the information terminal; a touch panel that brings up on display the screen based upon the video information received by the video reception unit and detects a touch position specified by a touch operation; a resolution information reception unit that receives resolution information of the display monitor from the information terminal; a conversion coefficient calculation unit that calculates a conversion coefficient in correspondence to a ratio of resolution of the display monitor to resolution of the touch panel based upon the resolution information received by the resolution information reception unit and resolution of the touch panel that is stored in advance; a displacement quantity calculation unit that calculates a quantity of displacement from a display position of the cursor to the touch position; a conversion unit that converts the quantity of displacement calculated by the displacement quantity calculation unit into a quantity of displacement on the display monitor based upon the conversion coefficient calculated by the conversion coefficient calculation unit; and a transmission unit that transmits, to the information terminal, displacement quantity information indicating the quantity of displacement converted by the conversion unit.

According to a ninth aspect of the present invention, in the display device of the eighth aspect, it is preferred that: the conversion coefficient calculation unit calculates the conversion coefficient for a transverse direction and a longitudinal direction, respectively, of the touch panel; the displacement quantity calculation unit calculates a quantity of displacement from a displacement position of the cursor to the touch position for the transverse direction and the longitudinal direction, respectively, of the touch panel; and the conversion unit converts the quantity of displacement for the transverse direction of the touch panel into a quantity of displacement for a transverse direction on the display monitor by using the conversion coefficient in the transverse direction and also converts the quantity of displacement for the longitudinal direction of the touch panel into a quantity of displacement for a longitudinal direction on the display monitor by using the conversion coefficient in the longitudinal direction.

A display device according to a tenth aspect of the present invention is to be connected with an information terminal and it includes: a video reception unit that receives video information about a screen including a cursor brought up on display at a predetermined reference position from the information terminal; a touch panel that brings up on display the screen based upon the video information received by the video reception unit and detects a touch position specified by a touch operation; and a transmission unit that transmits, to the information terminal, displacement quantity information corresponding to a quantity of displacement from the display position of the cursor to the touch position. This display device returns, after completion of the touch operation, the display position of the cursor to the reference position.

According to an eleventh aspect of the present invention, in the display device of the tenth aspect, it is preferred that, after completion of the touch operation, the transmission unit transmits displacement quantity information indicating a predetermined maximal quantity of displacement or a predetermined minimal quantity of displacement for the transverse direction and the longitudinal direction, respectively, of the touch panel to the information terminal, thereby returning the display position of the cursor to the reference position.

According to a twelfth aspect of the present invention, in the display device of the tenth or eleventh aspect, it is preferred that: a point of indication of the cursor is located at an end of the cursor; and the reference position is located at an end in an orientation opposite to an orientation directed from a center of the cursor to the point of indication.

According to a thirteenth aspect of the present invention, in the display device of the twelfth aspect, it is preferred that: the point of indication of the cursor is located at a left upper end of the cursor; and the reference position is located at a right lower end of the touch panel.

A display device according to a fourteenth aspect of the present invention is to be connected with an information terminal and it includes: a video reception unit that receives an image from the information terminal; and a touch panel that brings up on display the image received by the video reception unit and detects a touch position specified by a touch operation. This display device displaces, in response to the touch operation, a cursor brought up on display at an outer periphery of the touch panel to the touch position and, after completion of the touch operation, returns the cursor to an original position.

According to a fifteenth aspect of the present invention, in the display device of the fourteenth aspect, it is preferred that, after completion of the touch operation, displacement quantity information indicating a predetermined maximal quantity of displacement or a predetermined minimal quantity of displacement for the transverse direction and the longitudinal direction, respectively, of the touch panel is transmitted to the information terminal, thereby returning the display position of the cursor to the reference position.

According to a sixteenth aspect of the present invention, in the display device of the fourteenth or fifteenth aspect, it is preferred that: a point of indication of the cursor is located at a left upper end of the cursor; and the cursor is brought up on display at a right lower end of the touch panel before the touch operation is started and after the touch operation is completed.

Advantageous Effect of the Invention

According to the present invention, when a display screen of an information terminal, in which a touch panel input operation method is adopted, is brought up on display on a display device, it is possible to operate the information terminal through the display device.

BRIEF DESCRIPTION OF THE DRAWINGS

FIG. 4 A diagram illustrating the behaviors of the in-vehicle device and the portable terminal, respectively, when a touch operation is performed at the in-vehicle device.

DESCRIPTION OF EMBODIMENTS

Figure 1:
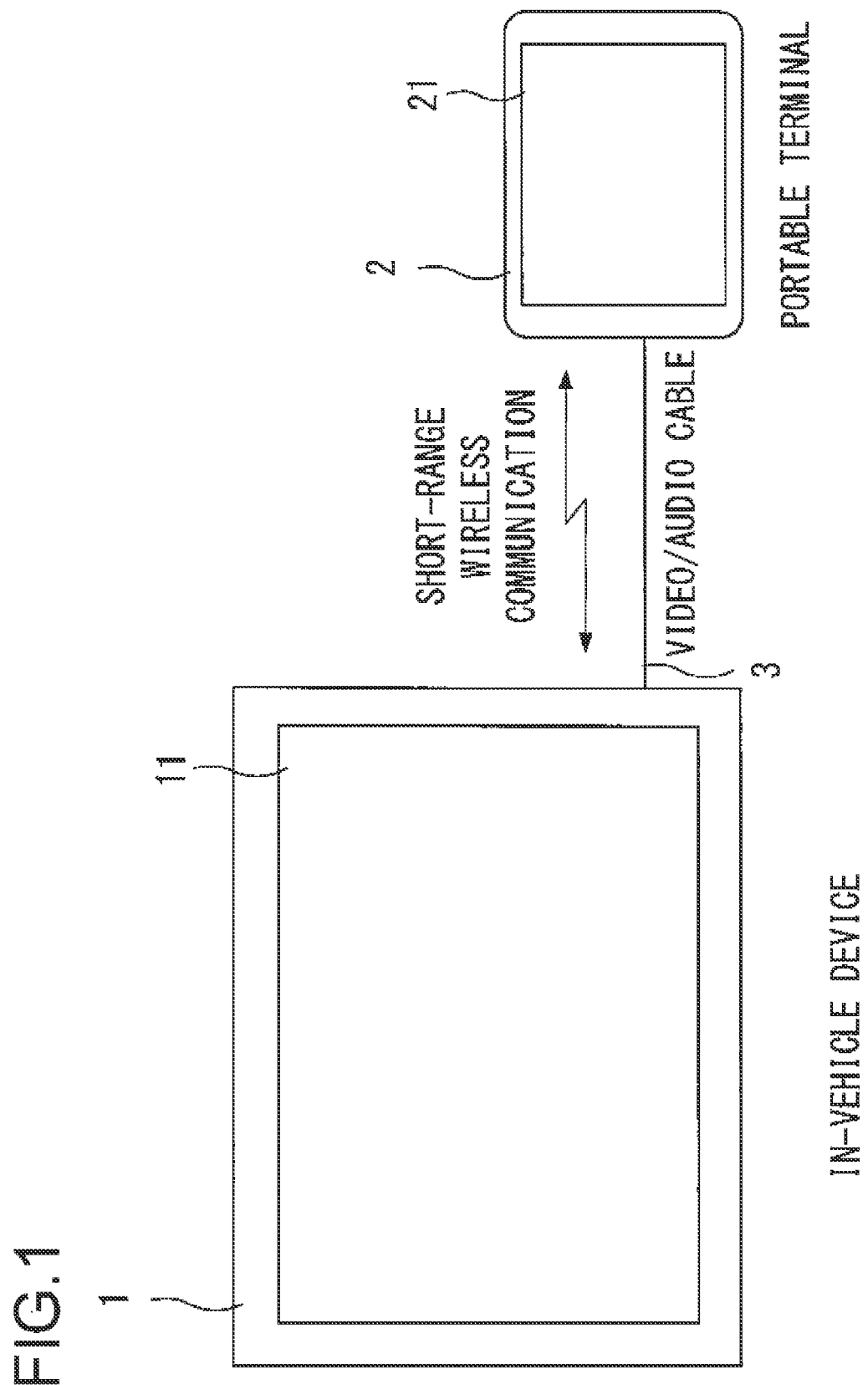
FIG. 1 A diagram showing the configuration of the in-vehicle information system achieved in an embodiment of the present invention.

FIG. 1 shows the configuration of the in-vehicle information system achieved in an embodiment of the present invention. The in-vehicle information system in FIG. 1, which is used as an onboard system installed in a vehicle, is configured by connecting an in-vehicle device 1 with a portable terminal 2 through short-range wireless communication and through wired communication enabled via a video/audio cable 3. The in-vehicle device 1 is installed at a fixed position within the vehicle, at, for instance, the instrument panel in the vehicle. The portable terminal 2 is a portable information terminal that can be carried by the user, such as a portable telephone or a smart phone. It is to be noted that short-range wireless communication between the in-vehicle device 1 and the portable terminal 2 may be carried out in compliance with, for instance, the Bluetooth standard. In addition, the wired communication via the video/audio cable 3 may be achieved in compliance with, for instance, the HDMI (high definition multimedia interface) standard.

A display unit 11 is provided to the in-vehicle device 1. The display unit 11 is a touch panel that is capable of displaying images and video images of various types, and, for example, may consist of a combination of resistive film type touch panel switches and a liquid crystal display. By performing touch operation with his finger or the like at any desired position on the display unit 11, and by thus designating an icon or operation button or the like displayed in that position, the user is able to cause the portable terminal 2 to execute various functions as desired. It should be understood that, in addition to the display unit 11, it would also be acceptable further to provide the in-vehicle device 1 with various operation switches corresponding to predetermined operations.

A display unit 21 is provided to the portable terminal 2. The display unit 21 is a touch panel that is capable of displaying images and video images of various types, and may, for example, consist of a combination of capacitance type touch panel switches and a liquid crystal display. By touching any desired position on the display unit 21, according to the details of the images or video images being displayed on the display unit 21, the user is able to cause the portable terminal 2 to execute various functions as desired. It is to be noted that while the display unit 21 in this example is a touch panel, the present invention may be adopted in conjunction with a standard display monitor instead of a touch panel. In such a case, it is desirable that the portable terminal 2 include various types of operation switches corresponding to specific contents or details of processing executed by the portable terminal 2. As an alternative, the present invention may be adopted in conjunction with a display unit 21 constituted with a touch panel-type display monitor in an portable terminal 2 that also includes operation switches, each corresponding to a specific operation.

Figure 2:
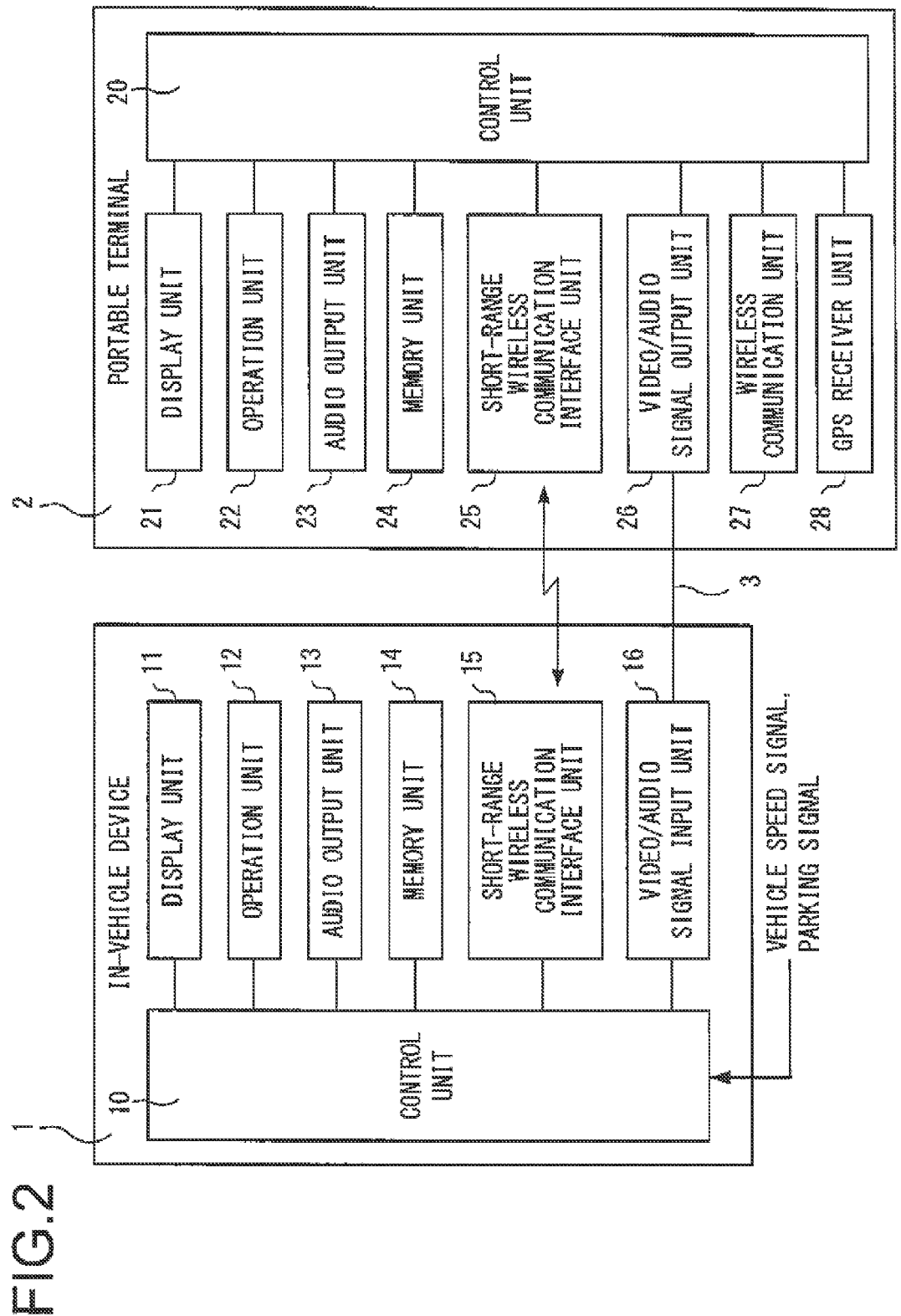
FIG. 2 A block diagram showing the structures adopted in the in-vehicle device and the portable terminal.

FIG. 2 is a block diagram showing the structures of the in-vehicle device 1 and the portable terminal 2. As shown in FIG. 2, the in-vehicle device 1 includes a control unit 10, the display unit 11, an operation unit 12, an audio output unit 13, a memory unit 14, a short-range wireless communication interface unit 15 and a video/audio signal input unit 16. The portable terminal 2 includes a control unit 20, the display unit 21, an operation unit 22, an audio output unit 23, a memory unit 24, a short-range wireless communication interface unit 25, a video/audio signal output unit 26, a wireless communication unit 27 and a GPS (global positioning system) receiver unit 28.

The control unit 10 in the in-vehicle device 1, which is constituted with a microprocessor, various peripheral circuits, a RAM, a ROM and the like, executes various types of processing based upon a control program recorded in the memory unit 14. Various types of image display processing, audio output processing and the like are enabled through processing executed by the control unit 10.

In addition, the control unit 10 obtains a vehicle speed signal and a parking signal output from the vehicle. The control unit 10 determines whether the vehicle is currently in a traveling state or in a stationary state based upon the vehicle speed signal and the parking signal. It is to be noted that the vehicle speed signal and the parking signal may be provided from the vehicle to the control unit 10 in the form of a vehicle speed pulse output via a CAN (controller area network) configuring an onboard communication network, from a vehicle speed sensor installed in the vehicle.

As previously described with reference to FIG. 1, the display unit 11 is a display monitor that may consist of a liquid crystal display or the like. The operation unit 12 is a section for detecting touch operation by the user on the display unit 11, and corresponds to the touch panel switches described above. It should be understood that though the display unit 11 and the operation unit 12 are shown separately in FIG. 2, actually these are integrated together and constitute a touch panel. Moreover, if operation switches are provided to the in-vehicle device 1 as previously described, then these operation switches are also included in the operation unit 12. The information of input operations that the user performs on the operation unit 12 is output to the control unit 10, and is reflected in the processing performed by the control unit 10.

The audio output unit 13, which includes an amplifier, a speaker and the like, is capable of outputting various types of sound under control executed by the control unit 10. For instance, music played back by reproducing music data read out from the portable terminal 2 or a recording medium (not shown), audio guidance used to guide the vehicle to a destination, or the like can be output from the audio output unit 13.

The memory unit 14, which is a non-volatile data storage device, may be constituted with an HDD (hard disk drive), a flash memory or the like. Various types of data, including the control program used by the control unit 10, as explained earlier, are stored in the memory unit 14. Data are read out from the memory unit 14 and written into the memory unit 14 as needed under control executed by the control unit 10.

The short-range wireless communication interface unit 15 executes, under control executed by the control unit 10, wireless interface processing required to enable short-range wireless communication with the portable terminal 2. For instance, it converts information output from the control unit 10 to a wireless signal in a predetermined signal format and transmits the wireless signal to the portable terminal 2. It also receives information output from the portable terminal 2 as a wireless signal in a predetermined signal format and outputs the received wireless signal information to the control unit 10. The short-range wireless communication interface unit 15 executes such interface processing in compliance with a specific communication standard such as Bluetooth.

The video/audio signal input unit 16 converts a video signal and an audio signal input from the portable terminal 2 via the video/audio cable 3 to image (video image) data for screen display and audio data for audio output respectively and outputs them to the control unit 10. The control unit 10, having obtained the image data and the audio data output from the video/audio signal input unit 16, controls the display unit 11 so as to bring up on display at the display unit 11 a screen image based upon the video data and also enables the audio output unit 13 to output sound based upon the audio data by controlling the audio output unit 13.

On the other hand, the control unit 20 in the portable terminal 2 is constituted with a microprocessor, various peripheral circuits, a RAM, a ROM and the like, as is the control unit 10 in the in-vehicle device 1, and executes various types of processing based upon a control program recorded in the memory unit 24.

As explained earlier, the display unit 21 is a touch panel-type display monitor. The operation unit 22 is used for purposes of user input operation detection. It is to be noted that while the display unit 21 and the operation unit 22 are shown as separate structural elements in FIG. 2, the display unit 21 and the operation unit 22 are, in fact, integrated together to constitute a touch panel, as is the display unit 11 explained earlier. In the alternative configuration described earlier, which includes operation switches disposed at the portable terminal 2, the operation switches correspond to the operation unit 22. Details of a user input operation performed at the operation unit 22 are output to the control unit 20 and are reflected in the processing executed by the control unit 20.

The audio output unit 23, which includes an amplifier, a speaker and the like, is capable of outputting various types of sound under control executed by the control unit 20. During a phone conversation carried out via the portable terminal 2, for instance, the voice of the other party is output from the audio output unit 23.

In the memory unit 24, which is a non-volatile data storage device similar to the memory unit 14 in the in-vehicle device 1, various types of data to be used in the processing executed by the control unit 20 are stored. Various application programs (hereafter simply referred to as applications), acquired by the user in advance, are also stored in the memory unit 24. The user is able to select a specific application among the various applications stored in the memory unit 24 and have it executed by the control unit 20. In this manner, various functions can be fulfilled in the portable terminal 2.

As does the short-range wireless communication interface unit 15 in the in-vehicle device 1, the short-range wireless communication interface unit 25 executes wireless interface processing in compliance with the predetermined communication standard. Namely, information communication between the in-vehicle device 1 and the portable terminal 2 is achieved as the short-range wireless communication interface unit 15 and the short-range wireless communication interface unit 25 exchange information with each other through wireless communication.

The video/audio signal output unit 26 converts an image (video image) and sound generated by the control unit 20 to a video signal and an audio signal in compliance with a predetermined communication standard such as HDMI and outputs the signals resulting from the conversion to the in-vehicle device 1 via the video/audio cable 3. As the video signal and the audio signal are input at the video/audio signal input unit 16 in the in-vehicle device 1, an image (a screen) identical to that brought up on display at the display unit 21 in the portable terminal 2 is brought up on display at the display unit 11 in the in-vehicle device 1 and sound identical to that output from the audio output unit 23 in the portable terminal 2 is also output from the audio output unit 13 in the in-vehicle device 1. The term "video mirroring" is often used to refer to this function.

The wireless communication unit 27 performs wireless communication to connect the portable terminal 2 with another portable terminal or a server via a wireless communication network (not shown). Through the wireless communication carried out via the wireless communication unit 27, the portable terminal 2 is able to perform a telephone conversation with another portable terminal, download a desired application from a server, and the like. It is to be noted that the wireless communication network enabling wireless communication carried out via the wireless communication unit 27 may be, for instance, a portable telephone network or the Internet, connection with which can be established via a wireless LAN.

The GPS receiver unit 28 receives GPS signals transmitted from GPS satellites and outputs the GPS signals thus received to the control unit 20. Each GPS signal carries, as information that can be used to determine the current position of the portable terminal 2 and the current time, information indicating the position of the GPS satellite having transmitted the particular GPS signal and the transmission time point. Thus, the current position and the current time can be calculated in the control unit 20 based upon information carried in GPS signals received from equal to or more than a predetermined minimum number of GPS satellites.

Next, a coordinated function achieved by the in-vehicle device 1 and the portable terminal 2 in this in-vehicle information system will be described. A coordinated function achieved by the in-vehicle device 1 and the portable terminal 2 is available in the in-vehicle information system. When the coordinated function is in effect, an image and sound corresponding to a specific application among the various applications, executed at the portable terminal 2 connected with the in-vehicle device 1 can be displayed and output at the in-vehicle device 1. In addition, contents of a user operation performed at the in-vehicle device 1 can be reflected in the operation of the application being executed at the portable terminal 2.

For instance, navigation processing may be executed so as to guide the vehicle to a destination by executing a navigation application at the portable terminal 2. In the navigation processing, a map screen image with a map of an area around of the current position drawn therein is created at the portable terminal 2 and image information indicating the map screen image is output, by using the video signal explained earlier, to the video/audio signal input unit 16 from the video/audio signal output unit 26 via the video/audio cable 3. Through this processing, the map screen image is transmitted from the portable terminal 2 to the in-vehicle device 1 so as to bring up the map screen image of the area around the current position at the display unit 11 in the in-vehicle device 1. In addition, as the user sets a destination through a user operation performed at the operation unit 12 in the in-vehicle device 1 or at the operation unit 22 in the portable terminal 2, a search for a recommended route from the current vehicle position designated as a departure point to the destination having been set is executed at the portable terminal 2. As the vehicle approaches a guidance requiring point on the recommended route, audio guidance data indicating the direction along which the vehicle is to advance at the particular guidance requiring point are transmitted from the portable terminal 2 to the in-vehicle device 1. As a result, audio guidance can be output from the audio output unit 13 in the in-vehicle device 1. It is to be noted that specific signals may be output from the portable terminal 2 to the in-vehicle device 1, each in correspondence to the timing of the audio guidance data output start and the timing of the audio guidance data output end. Through these measures, it can be ensured that the user will be able to hear the audio guidance clearly, even if other audio data are being output via the radio, the CD player or the like in the in-vehicle device 1, by lowering the sound volume for the other audio output during the audio guidance output. As described above, the in-vehicle device 1 provides the user with guidance information so that the user is able to drive the vehicle to the destination without getting lost by displaying a map image at the display unit 11 and outputting audio guidance via the audio output unit 13.

It is to be noted that various types of data including map data needed by the portable terminal 2 when executing the navigation application may be stored in advance in the memory unit 24 in the portable terminal 2. As an alternative, only data that are absolutely necessary may be stored in the memory unit 24 and in such a case, the portable terminal 2 should be able to connect with a specific server via the wireless communication unit 27 in order to obtain necessary additional data each time it executes the navigation application.

At the portable terminal 2, an application selected by the user, among the plurality of applications including a navigation application such as that described above, is executed. The user is able to select a desired application he wishes to be executed at the portable terminal 2 by operating the operation unit 22 in a menu screen on display at the display unit 21 in the portable terminal 2. In the menu screen, for instance, icons that represent applications for which a coordinated function is available are brought up on display in juxtaposition. When the user selects any one of the icons by operating a touch panel or the like in the menu screen, an application in correspondence to the selected icon is executed at the portable terminal 2.

In addition, the portable terminal 2 transmits a menu screen image in the form of a video signal provided from the video/audio signal output unit 26, to the in-vehicle device 1. Based upon the video signal transmitted from the portable terminal 2, the in-vehicle device 1 brings up the menu screen on display at the display unit 11. As the user selects a desired application in this menu screen by a touch operation to the operation unit 12, which is a part of a touch panel, operation information corresponding to the touch operation is transmitted via the short-range wireless communication interface unit 15 from the in-vehicle device 1 to the portable terminal 2.

The operation information transmitted from the in-vehicle device 1 as described above is received at the short-range wireless communication interface unit 25 in the portable terminal 2 and the operation information thus received is then output to the control unit 20. Based upon the operation information received as described above, the control unit 20 identifies the application selected by the user at the in-vehicle device 1 and executes the selected application. Through this process, the user is able to select a desired application in the menu screen on display at the in-vehicle device 1, just as he is able to select a desired application in the menu screen brought up on display at the display unit 21 at the portable terminal 2, and have the selected application executed in the portable terminal 2.

It is to be noted that the control unit 20 is able to execute each application either in the foreground or in the background. Any application being executed in the foreground is designated as a subject application for image display and operation input both at the in-vehicle device 1 and at the portable terminal 2. While the control unit 20 does execute the corresponding processing for an application running in the background, the application is not a subject application for image display or operation input at the in-vehicle device 1 or the portable terminal 2. However, sound originating from the application being executed in the background may be output.

In order to enable a coordinated function such as that described above achieved by connecting the in-vehicle device 1 to the portable terminal 2, an application referred to as an application manager is installed in advance and stored in the memory unit 24 at the portable terminal 2. Namely, a plurality of applications including the application manager is stored in the memory unit 24. As the portable terminal 2 becomes connected to the in-vehicle device 1, the application manager is read out from the memory unit 24 and is executed by the control unit 20.

Figure 3:
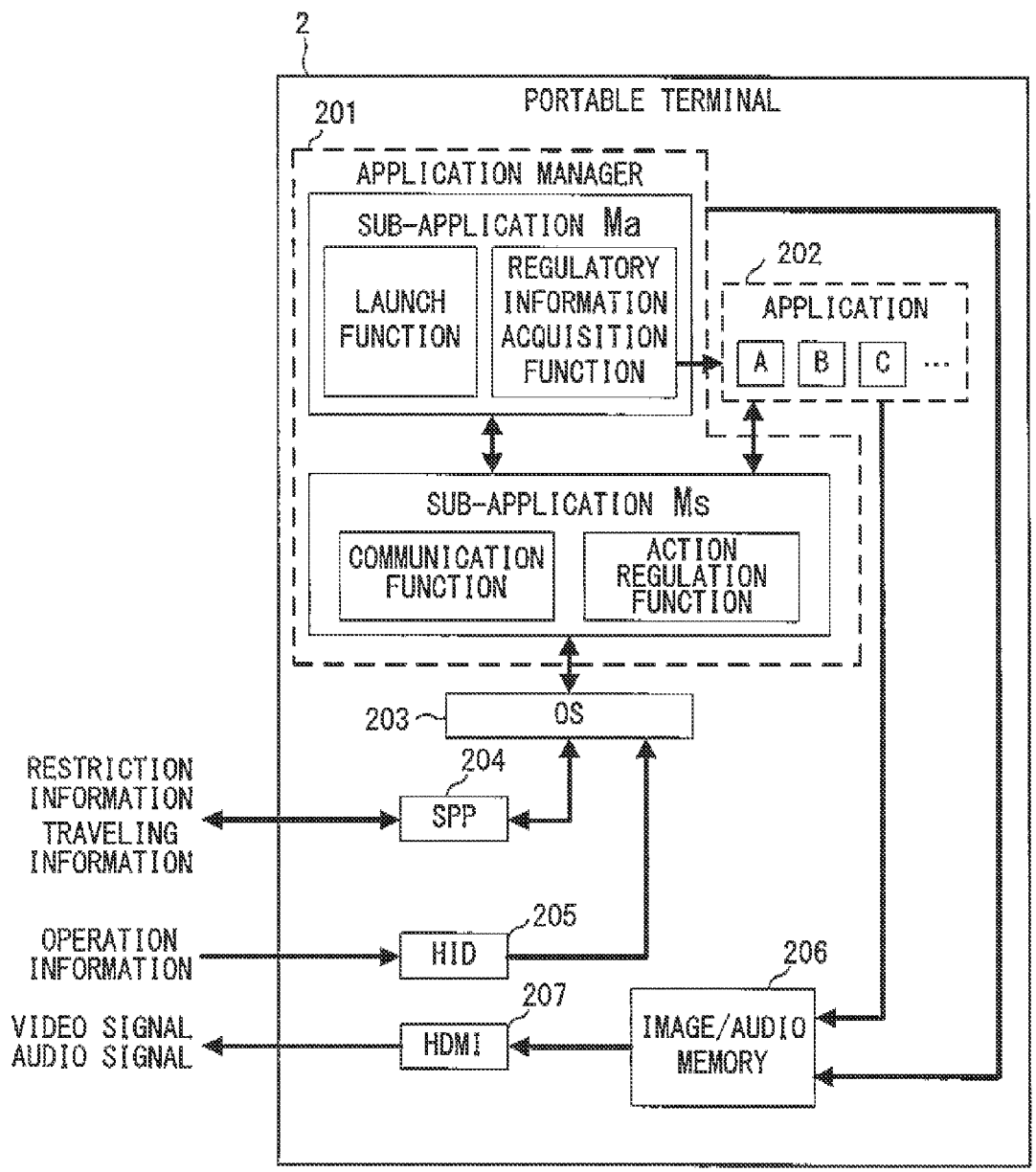
FIG. 3 A schematic diagram illustrating the software structure adopted in the portable terminal.

FIG. 3 is a diagram schematically illustrating the software structure adopted in the portable terminal 2. An application manager 201 in FIG. 3 includes a sub-application Ma and a sub-application Ms.

The sub-application Ma has a launch function for starting up applications other than the application manager 201 itself and a regulatory information acquisition function for obtaining regulatory information for each application. The control unit 20 is able to use these functions by executing the sub-application Ma in the foreground. For instance, the launch function is used to call up another application and have that application executed in the foreground by the control unit 20, instead of the sub-application Ma. In addition, the regulatory information acquisition function is used to obtain the regulatory information indicating contents of action regulation to be imposed on each application among the plurality of applications stored in the memory unit 24 while the vehicle is in a traveling state from the memory unit 24, an external server or the like.

The sub-application Ms has a communication function to be engaged when connecting the portable terminal 2 to the in-vehicle device 1 and an action regulation function for imposing action regulation while the vehicle is in the traveling state. The control unit 20 is able to use these functions by executing the sub-application Ms in the background. For instance, the communication function enables execution of communication processing so as to allow the information terminal 2 and the in-vehicle device 1 to exchange information needed for coordinated operations. In addition, the action regulation function is used to determine the contents of the action regulation to be imposed on the application being executed in the foreground while the vehicle is in a traveling state by referencing the regulatory information obtained through the regulatory information acquisition function of the sub-application Ma described earlier. Restriction information indicating the determination results is transmitted from the portable terminal 2 to the in-vehicle device 1 through the communication function and is utilized in the in-vehicle device 1 when imposing action restriction while the vehicle is in a traveling state.

As explained above, the application manager 201 is configured with two separate sub-applications, i.e., the sub-application Ma executed by the control unit 20 in the foreground and the sub-application Ms executed by the control unit 20 in the background. By adopting this structure, optimization of function assignments within the application manager 201 is achieved so as to assign functions best suited for foreground execution as foreground functions and assign functions best suited for background execution as background functions.

The application manager 201 calls up a given application among various applications 202 through the launch function of the sub-application Ma. The application thus called up is then executed by the control unit 20 in the foreground instead of the sub-application Ma. It is to be noted that the following description will be given in reference to FIG. 3 by assuming that application A is being executed.

An OS (operating system) 203 is a software program used to manage the overall operations of the portable terminal 2. When the portable terminal 2 is connected to the in-vehicle device 1, the OS 203 acts as a go-between for information output from the sub-application Ms executed by the control unit 20 in the background and input to an SPP (Serial Port Profile) 204 and an HID (Human Interface Device) profile 205 and vice versa. The SPP 204 and the HID profile 205 are drivers used in short-range wireless communication carried out between the in-vehicle device 1 and the portable terminal 2. These drivers are standardized as part of the standard used in compliance with Bluetooth.

The SPP 204 executes processing for transmitting the restriction information indicating the results of the determination made with regard to the action regulation contents through the action regulation function of the sub-application Ms, and processing for receiving traveling information transmitted from the in-vehicle device 1 based upon the vehicle traveling state. The HID profile 205 executes processing for receiving operation information output in correspondence to contents of the user operation performed at the in-vehicle device 1. The contents of the various types of information received by the SPP 204 and the HID profile 205 are output to the sub-application Ms via the OS 203 and are then transferred to the application, the execution of which is underway, through the communication function of the sub-application Ms. It is to be noted that the transmission/reception of the various types of information is enabled through wireless communication carried out by the short-range wireless communication interface unit 15 at the in-vehicle device 1 and the short-range wireless communication interface unit 25 at the portable terminal 2.

When the sub-application Ma is currently executed in the foreground by the control unit 20, the sub-application Ma generates a menu screen image that will allow the user to select an application he wishes to have executed by the launch function explained earlier. If, on the other hand, an application A is currently being executed in the foreground by the control unit 20, the application A generates a specific image and sound by utilizing, as needed, the traveling information or the operation information transferred from the sub-application Ms. The image and the sound are then stored into an image/audio memory 206 on a temporary basis, before they are output to an HDMI driver 207.

The HDMI driver 207 executes processing for converting an image and sound generated by the sub-application Ma, application A or the like to a video signal and an audio signal through a method in compliance with the HDMI standard. The video signal and the audio signal resulting from the conversion are then output by the video/audio signal output unit 26 to in-vehicle device 1 via the video/audio cable 3.

The portable terminal 2 has a software structure as described above. It is to be noted that the software structure may be achieved by using, for instance, the Android operating system. In the software configured in the Android operating system, the sub-application Ma will be executed in the "Activity" thread and the sub-application Ma will be executed in the "Service" thread so as to enable execution of the sub-application Ma in the foreground by the control unit 20 concurrently with the sub-application Ms, being executed in the background.

Next, operations that will occur when a touch operation is performed by the user at the in-vehicle device 1 are explained in detail. As described earlier, when a touch operation is performed by the user on the screen that is brought up on display on the display unit 11 of the in-vehicle device 1, operation information corresponding to the touch position specified by the touch operation is transmitted from the in-vehicle device 1 to the portable terminal 2. On this occasion, the in-vehicle device 1 uses a communication format for a mouse, called HID packet, for transmitting the operation information to the portable terminal 2.

It is to be noted that the HID packet, which is a communication format for a mouse used in Bluetooth, are generally used when a mouse is used as an input device of the portable terminal 2. When the mouse is used, according to the HID packet, displacement quantity information corresponding to the movement of the mouse and button operation information corresponding to various types of button operations, for instance, a click operation in a predetermined format can be transmitted from the mouse to the portable terminal 2 at predetermined time intervals. Upon receipt of these pieces of information transmitted from the mouse via the HID packet, the portable terminal 2 performs reception processing through the HID profile 205 shown in FIG. 3 and the OS 203 reads the received information to detect the movement of the mouse and causes the cursor on the screen to be displaced in correspondence to the detected movement of the mouse. In addition, when a button operation such as click or the like is performed, the OS 203 reads the content of the operation that is performed by the user on the screen based upon the content of the screen corresponding to the cursor position at that time and the content of the button operation. At the control unit 20, an application corresponding to the icon specified on the menu screen in correspondence to the content of the operation of the mouse read by the OS 203 is started up or the processing corresponding to the operation specified on the screen of the application being executed is executed.

In the in-vehicle information system according to the present embodiment, the operation information corresponding to the touch operation at the in-vehicle device 1 is transmitted from the in-vehicle device 1 to the portable terminal 2 by using the HID packet as described above. Through this measure, the content of touch operation can be recognized by the OS 203 at the portable terminal 2, similarly to the case in which a mouse is used.

FIG. 4(*a*) and FIG. 4(*b*) are diagrams illustrating the operations of the in-vehicle device 1 and the portable terminal 2, respectively, when the touch operation is performed at the in-vehicle device 1. FIG. 4(*a*) illustrates the condition before the touch operation. In FIG. 4(*a*), arrow-shaped cursors 40 brought up on display at respective right lower ends of the outer peripheries of the display units 11 and 21, respectively, have each a tip portion of the arrow, a left upper end of which serves as a point of indication. In other words, before the touch operation, the cursor 40 on the screen indicates a reference position 41 located at a position accounting for the right lower end of the display unit 11 in the in-vehicle device 1 or a reference position 42 located at a position accounting for the right lower end of the display unit 21. It is to be noted that the most part of the cursor 40 is located outside the range of each screen display at the display units 11 and 21 and actually, it is not brought up on display. Therefore, in FIG. 4(*a*), the display position of the cursor 40 is shown in broken line.

Before the touch operation, the portable terminal 2 brings up at the display unit 21 a screen including the cursor 40 brought up on display at the reference position 42 and at the same time outputs video information of this screen to the in-vehicle device 1 via the video/audio cable 3 by using the video signal described above. When the in-vehicle device 1 receives the video information from the portable terminal 2, the in-vehicle device 1 brings up on display at the display unit 11 the same screen as that which is brought up on display at the display unit 21 of the portable terminal 2 based upon the video information. Through these measures, as shown in FIG. 4(*a*), the screen including the cursor 40 brought up on display at the reference position 41 is displayed at the display unit 11.

Here, as shown in FIG. 4(*a*), it is assumed that the resolution of the display unit 11 in the X direction (transverse direction) is expressed as Xv, the resolution of the display unit 11 in the Y direction (longitudinal direction) is expressed as Yv. It is also assumed that the resolution of the display unit 21 in the X direction (transverse direction) is expressed as Xs and the resolution of the display unit 21 in the Y direction (longitudinal direction) is expressed as Ys. The information about these resolutions is stored in advance in the memory units 14 and 24 at the in-vehicle device 1 and the portable terminal 2, respectively.

FIG. 4(*b*) shows the condition when a touch operation is performed. It is assumed that as shown in FIG. 4(*b*), the touch operation is performed by the user to the in-vehicle device 1 to specify a touch position 43. When the in-vehicle device 1 detects this touch operation, it calculates a displacement quantity Px in the X direction and a displacement quantity Py in the Y direction, as quantities of displacement ranging from the reference position 41, which was indicated by the cursor 40 before the touch operation, to the touch position 43. The displacement quantities Px and Py can be calculated by, for instance, counting the number of pixels existing between the reference position 41 and the touch position 43 in the X direction and in the Y direction, respectively. In this case, when it is assumed that the left upper end of the display unit 11 is defined to be a start point, the rightward orientation is defined to be a positive orientation of the X direction, and the downward orientation is defined to be a positive orientation of the Y direction, both the displacement quantities Px and Py between the reference position 41 and the touch position 43 are obtained as negative values.

After the displacement quantity Px in the X direction and the displacement quantity Py in the Y direction are calculated as described above, the in-vehicle device 1 subsequently converts the displacement quantities Px and Py into displacement quantities Qx and Qy, respectively, on the display unit 21 of the portable terminal 2. This conversion of displacement quantities is performed based upon the resolutions Xv, Yv and the resolutions Xx, Ys described above according to the following expression (1).

$$Qx=PxX(Xs/Xv),\ Qy=PyX(Ys/Yv) \quad (1)$$

In the expression (1) above, Xs/Xv and Ys/Yv are conversion coefficients used when the displacement quantities Px and Py are converted into the displacement quantities Qx and Qy, respectively. The in-vehicle device 1 is enabled to obtain these conversion coefficients by obtaining the resolutions Xs and Ys of the display unit 21 from the portable terminal 2 in advance.

Once the displacement quantities Qx and Qy after the conversion are calculated, the in-vehicle device 1 transmits displacement quantity information indicating the displacement quantities Qx and Qy to the portable terminal 2 according to the HID packet.

When the portable terminal 2 receives displacement quantity information indicating the displacement quantities Qx and Qy from the in-vehicle device 1, it causes the displacement quantities Qx and Qy to be read by the OS 203. Then, as shown in FIG. 4(b), it brings up on display, at the display unit 21, the cursor 40 as being displaced by the displacement quantities Qx and Qy from the reference position 42 located at the right lower end at the display unit 21 and at the same time outputs video information of the screen including the cursor 40 thus displaced to the in-vehicle device 1 via the video/audio cable 3 by using the video signal described above.

When the in-vehicle device 1 receives the video information about the screen including the cursor 40 after the displacement from the portable terminal 2, it brings up on display the same screen as that brought up on display at the display unit 21 of the portable terminal 2 at the display unit 11 based upon the received video information. As a result, the screen in which the cursor 40 specifies the touch position 43 is brought up on display at the display unit 11 as shown in FIG. 4(b).

After having transmitted the displacement quantity information indicating the displacement quantities Qx and Qy, the in-vehicle device 1 transmits displacement quantity information indicating that the displacement quantity is 0 to the portable terminal 2 through the HID packet. On this occasion, additionally, button operation information indicating that a predetermined button operation, for instance, a left click operation has been performed is transmitted together.

Upon receipt of the displacement quantity information and the button operation information from the in-vehicle device 1, the portable terminal 2 causes the content of the button operation that is indicated by the button operation information to be read by the OS 203. Then, for instance, startup of the application corresponding to the icon at the touch position 43 is performed in correspondence to the content of the screen brought up on display at the display position, that is, the touch position 43, of the cursor 40 after the displacement and the content of the button operation. In the manner as that explained earlier, the processing in correspondence to the touch operation performed by the user to the in-vehicle device 1 can be executed at the portable terminal 2.

It is to be noted that the operation at the time of the touch operation explained above is an example of a single tap operation, which is specified by the user's tapping a given touch position on the touch panel once. In this case, the in-vehicle device 1 transmits to the portable terminal 2 the same operation information as that transmitted when a click operation is performed with a mouse. As another way, the user may perform various operations; for instance, a double tap operation in which the touch position is specified by tapping twice, a flick operation in which along with the touch operation, the touch position is displaced in a predetermined direction, a press-and-hold operation in which the same touch position is continued to be touched for a predetermined period of time or longer, and so on may be performed to the in-vehicle device 1. The in-vehicle device 1 identifies types of the touch operations, one from another, and transmits to the portable terminal 2 different operation information in correspondence to the respective types of the touch operations.

Specifically, when the double tap operation is performed, the in-vehicle device 1 transmits displacement quantity information indicating the displacement quantities Qx and Qy after conversion in correspondence to the displacement quantities Px and Py and thereafter transmits twice the button operation information indicating a predetermined button operation along with the displacement quantity information indicating that the displacement quantity is 0. In other words, the in-vehicle device 1 transmits to the portable terminal 2 the same operation information as that transmitted when the double click operation is performed with a mouse.

On the other hand, when the flick operation is performed, the in-vehicle device 1 transmits the displacement quantity information indicating the displacement quantities Qx and Qy after conversion in correspondence to the displacement quantities Px and Py and thereafter calculates the displacement quantity of the touch position during the flick operation at predetermined time intervals. Then, the in-vehicle device 1 converts, according to the expression (1) described above, the displacement quantity of the touch position during the flick operation into the displacement quantity on the display unit 21 of the portable terminal 2 and transmits the displacement quantity information indicating the displacement quantity after the conversion along with the button operation information indicating a predetermined button operation. After the flick operation is completed, the in-vehicle device 1 finally transmits the displacement quantity information indicating that the displacement quantity is 0. In other words, the in-vehicle device 1 transmits to the portable terminal 2 the same operation information as that transmitted when the drag-and-drop operation is performed with a mouse.

In addition, when the press-and-hold operation is performed, the in-vehicle device 1 transmits the displacement quantity information indicating the displacement quantities Qx and Qy after conversion in correspondence to the displacement quantities Px and Py, respectively, and thereafter continually transmits the button operation information indicating a predetermined button operation along with the displacement quantity information indicating that the displacement quantity is 0 during the press-and-hold operation. That is, the in-vehicle device 1 transmits to the portable terminal 2 the same operation information as that transmitted when press and hold operation is performed with a mouse.

As the portable terminal 2 receives the operation information in correspondence to the type of the touch operation as explained earlier from the in-vehicle device 1, the portable terminal 2 can identify the type of the touch operation performed by the user to the in-vehicle device 1 and execute the processing corresponding to the touch operation.

Figure 5:
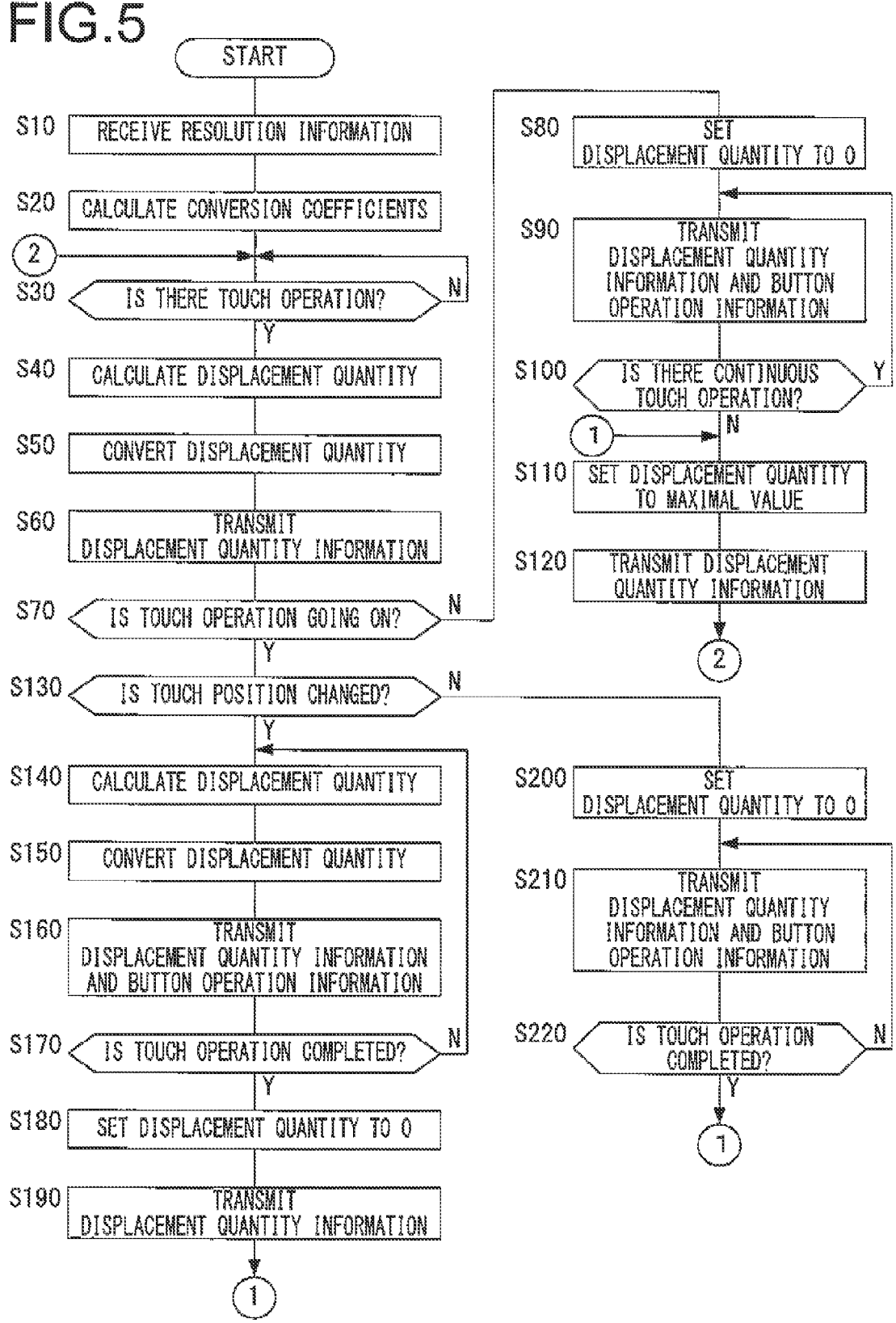
FIG. 5 A flowchart illustrating the processing executed in the in-vehicle device when the touch operation is performed.

FIG. 5 presents a flowchart illustrating the processing executed at the in-vehicle device 1 when a touch operation is performed. The processing illustrated in this flowchart is to be executed by the control unit 10 once communication is established between the in-vehicle device 1 and the portable terminal 2.

In step S10, the control unit 10 receives the resolution information of the display unit 21 transmitted from the portable terminal 2 by using the short-range wireless communication interface unit 15. In this step, as described earlier, the control unit 10 receives the resolution Xs in the X direction of the display unit 21 and the resolution Ys in the Y direction of the display unit 21 from the portable terminal 2.

In step S20, the control unit 10 calculates a conversion coefficient in correspondence to a ratio of the resolution of the display unit 21 to the resolution of the display unit 11 based upon the resolution information of the display unit 21 received from the portable terminal 2 in step S10 and the resolution of the display unit 11 stored in the memory unit 14 in advance. Here, as shown in the expression (1) described above, the resolutions Xs and Ys of the display unit 21 shown in the resolution information received in step S10 are divided by the resolution Xv of the display device 11 in the X direction and the resolution Yv of the display unit 11 in the Y direction, respectively, to calculate a conversion coefficient in the X direction, Xx/Xv and a conversion coefficient in the Y direction, Ys/Yv, respectively.

In step S30, the control unit 10 makes a decision as to whether or not a touch operation has been performed by the user to the operation unit 12, which is a touch panel switch that is integrally constituted with the display unit 11. If a touch operation has been performed, the control unit 10 detects the touch operation and the operation proceeds to step S40.

In step S40, the control 10 calculates displacement quantities from the display position of the cursor when the touch operation was detected in step S30 to the touch position specified by that touch operation. Here, as described earlier, the control unit 10 calculates the displacement quantity in the X direction, Px, and the displacement quantity in the Y direction, Py, as the displacement quantities from the reference position 41 at the right lower end to the touch position 43.

In step S50, the control unit 10 converts the displacement quantities calculated in step S40 into displacement quantities on the display unit 21 of the portable terminal 2. Here, the control unit 10 converts the displacement quantity in the X direction, Px, and the displacement quantity in the Y direction, Py, calculated relative to the display unit 11, the displacement quantities in the X direction, Qx, and the displacement quantity in the Y direction, Qy on the display unit 21 according to the expression (1) described above by using the conversion coefficient in the X direction, Xs/Xv, and the conversion coefficient in the Y direction, Ys/Yv, that have been calculated in step S20.

In step S60, the control unit 10 transmits to the portable terminal 2 the displacement quantity information indicating the displacement quantity converted in step S50 by using the short-range wireless communication interface unit 15. As a result, displacement quantity information in correspondence to the displacement quantity from the display position of the cursor at the time of the touch operation to the detected touch position is transmitted from the in-vehicle device 1 to the portable terminal 2. Transmission of the displacement quantity information is performed by using the HID packet, which is a communication format for a mouse as described above. The displacement quantity information transmitted from the in-vehicle device 1 is received by the short-range wireless communication interface unit 25 in the portable terminal 2 and read by the OS 203. As a result, the cursor position on the screen is displaced at the portable terminal 2 and the video information including the cursor after the displacement is transmitted from the portable terminal 2 to the in-vehicle device 1 and brought up on display on the display unit 11.

In step S70, the control unit 10 makes a decision as to whether or not the touch operation detected in step S30 is going on. If the touch operation is completed within a predetermined period of time, it is decided that the touch operation is not going on and the operation proceeds to step S80, whereas if it is decided that the touch operation is going on, the operation proceeds to step S130.

When the operation proceeds from step S70 to step S80, the control unit 10 sets the displacement quantity in the displacement quantity information to 0 in step S80. Here, the displacement quantity is set to 0 for both the X direction and the Y direction. Subsequently, in step S90, the control unit 10 transmits the displacement quantity information indicating that the displacement quantity set in step S80 is 0 and the button operation information indicating that the predetermined button operation such as a left click operation has been performed to the portable terminal 2 via the short-range wireless communication interface unit 15.

In step S100, the control unit 10 makes a decision as to whether or not another touch operation is performed to the operation unit 12, which is a touch panel switch that is integrally constituted with the display unit 11, subsequent to the touch operation detected in step S30. If touch operations are not performed successively, that is, a single tap operation is performed, the operation proceeds to step S110. As a result, if the single tap operation has been performed, the displacement quantity information is transmitted in step S60 and thereafter the processing in step S90 is executed only once, in which along with the displacement quantity information indicating that the displacement quantity is 0, the button operation information is transmitted from the in-vehicle device 1 to the portable terminal 2.

On the other hand, if a decision is made that the touch operations have been performed successively in step S100, the operation returns to step S90 and the processing in step S90 is repeatedly executed the number of times in which the touch operations occurred. As a result, if the double tap operation has been preformed, the displacement quantity information is transmitted in step S60 and thereafter, the processing in step S90 is executed twice, so that along with the displacement quantity information indicating that the displacement quantity is 0, the button operation information is transmitted twice from the in-vehicle device 1 to the portable terminal 2. It is to be noted that if three or more touch operations have been performed successively, the third or subsequent touch operations may be invalidated in order to treat the three or more touch operations as a double tap operation. As an alternative, a configuration may be adopted in which the displacement quantity information and the button operation information are transmitted three or more times successively by repeatedly executing the processing in step S90 as many times as that in which the touch operations have been performed.

In step S110, the control unit 10 sets a predetermined maximal value of displacement quantity in the displacement quantity information. Here, a predetermined maximal displacement quantity is set for both the X and Y directions. Subsequently, in step S120, the control unit 10 transmits the displacement quantity information indicating the maximal displacement quantity set in step S110 to the portable terminal 2 via the short-range wireless communication interface unit 15. If the processing in step S120 is executed, the operation returns to step S30 and the processing as described above is repeated.

The displacement quantity information indicating the maximal displacement quantity transmitted in step S120 is received by the short-range wireless communication interface unit 25 at the portable terminal 2 and read by the OS 203. Then, the display position of the cursor on the screen at the display unit 21 is displaced to maximal positions in the X and Y positions, that is, to the reference position 42 at the right lower end shown in FIGS. 4(*a*) and 4(*b*) regardless of the touch position specified by lastly performed touch operation relative to the in-vehicle device 1. As the video information in correspondence to the screen after the displacement of the cursor is transmitted from the portable terminal 2 to the in-vehicle device 1 and brought up on display at the display unit 11, the display position of the cursor on the screen at the display unit 11 in the in-vehicle device 1 is returned back to the original reference position 41.

On the other hand, if the operation proceeds from step S70 to step S130, the control unit 10 in step S130 makes a decision as to whether or not the touch position has been changed by the touch operation detected in step S30. If it is decided that the touch position has been changed, the operation proceeds to step S140. If, on the other hand, it is decided that the touch position has not been changed, the operation proceeds to step S200.

If the operation proceeds from step S130 to step S140, the control unit 10 in step S140 calculates the displacement quantity from the last touch position to the present touch position. Subsequently, in step S150, the control unit 10 converts the displacement quantity calculated in step S140 to displacement quantity on the display unit 21 of the portable terminal 2.

In step S160, the control unit 10 transmits the displacement quantity information indicating the displacement quantity converted in step S150 and the button operation information indicating that the predetermined button operation such as a left click operation has been performed to the portable terminal 2 via the short-range wireless communication interface unit 15. As a result, when the touch operation is going on while the touch position is being changed, the displacement quantity information indicating the displacement quantity in correspondence to the change in the touch position and the button operation information are transmitted from the in-vehicle device 1 to the portable terminal 2. The transmitted displacement quantity information here is received by the short-range wireless communication interface unit 25 in the portable terminal 2 and read by the OS 203. As a result, the cursor position on the screen at the portable terminal 2 is displaced in correspondence to the change in touch position at the in-vehicle device 1 and the video information including the cursor after the displacement is transmitted from the portable terminal 2 to the in-vehicle device 1 and brought up on display at the display unit 11.

In step S170, the control unit 10 makes a decision as to whether or not the touch operation is completed. If the touch operation is going on, the operation returns to step S140 and the processing in steps S140 through S160 is repeated. Through these measures, if a flick operation, in which the touch position is changed while the touch operation is going on, has been performed, and if the touch operation is going on after the displacement quantity information has been transmitted in step S60, the displacement quantity information indicating the displacement quantity in correspondence to the change in the touch position and the button operation information are transmitted continuously. If the touch operation is completed, the operation proceeds to step S180.

In step S180, the control unit 10 sets the displacement quantity in the displacement quantity information to 0 in the same manner as that in step S80 described above. Subsequently, in step S190, the control unit 10 transmits the displacement quantity information indicating that the displacement quantity set in step S180 is 0 to the portable terminal 2 via the short-range wireless communication interface unit 15. Through this measure, if the flick operation has been performed and after the touch operation has been completed, the displacement quantity information indicating that the displacement quantity is 0 is transmitted from the in-vehicle device 1 to the portable terminal 2.

Once the processing in step S190 is executed, the control unit 10 causes the display position of the cursor on the screen at the display unit 11 to be returned back to the original reference position 41 by executing each processing in steps S110 and S120 described above. Thereafter, the operation returns to step S30 and the processing as described above is repeated.

On the other hand, if the operation proceeds from step S130 to S200, the control unit 10 in step S200 sets the displacement quantity in the displacement quantity information to 0 in the same manner as that in steps S80 and S180 described above. Subsequently in step S210, the control unit 10 transmits the displacement quantity information indicating that the displacement quantity set in step S200 is 0 and the button operation information indicating that a predetermined button operation such as a left click operation has been performed to the portable terminal 2 via the short-range wireless communication interface unit 15.

In step S220, the control unit 10 makes a decision as to whether or not the touch operation is completed. If the touch operation is going on, the operation returns to step S210 and the processing in step S210 is repeated. Through this measure, if a press-and-hold operation, in which a touch operation is going on for a predetermined period of time or longer with the touch position being unchanged, has been performed and if the touch operation is going on after the displacement quantity information has been transmitted in step S60, the button operation information along with the displacement quantity information indicating that the displacement quantity is 0 is continuously transmitted. If the touch operation is completed, the control unit 10 causes the display position of the cursor on the screen at the display unit 11 to be returned to the original reference position 41 by executing each processing in steps S110 and S120. Thereafter, the operation returns to step S30 and the processing described above is repeated.

According to the embodiment of the present invention explained above, operations and advantageous effects as listed in (1) through (13) below can be obtained.

(1) The in-vehicle device 1 receives video information about a screen including the cursor 40 from the portable terminal 2 via the video/audio signal input unit 16 and brings up the screen on display at the display unit 11 in the form of a touch panel based upon the video information. Then, the in-vehicle device 1 detects a touch position specified by a touch operation by the user with the operation unit 12 that constitutes the touch panel together with the display unit 11. On this occasion, through the processing by the control unit 10, the displacement quantity information in correspondence to the displacement quantity from the display position of the cursor 40 to the touch position is transmitted via the short-range wireless communication interface unit 15 (step S60). Through this measure, when the display screen of the portable terminal 2 in which the touch panel operation is adopted is brought up on display at the in-vehicle device 1, the portable terminal 2 can be operated through the in-vehicle device 1.

(2) The control unit 10 transmits in addition button operation information indicating that a predetermined button operation has been performed to the portable terminal 2 via the short-range wireless communication interface unit 15 (steps S90, S160, S210). Through these measures, the content of the touch operation can be recognized at the portable terminal 2 with the processing that is the same as that is executed when a mouse is used.

(3) If the touch operation is completed within a predetermined period of time with the touch position being unchanged, the control unit 10 transmits the displacement quantity information in correspondence to the displacement quantity from the display position of the cursor 40 to the touch position and thereafter the control unit 10 transmits the button operation information along with the displacement quantity information indicating that the displacement quantity is 0 (step S90). A configuration is adopted such that if the single tap operation has been performed as described above, the same operation information as that transmitted when the click operation has been performed with a mouse is transmitted from the in-vehicle device 1 to the portable terminal 2. Therefore, at the portable terminal 2, the single tap operation can be recognized as the click operation.

(4) In addition, if the touch operation has been repeated a plurality of times with the touch position being unchanged, the control unit 10 transmits, in step S60, displacement quantity information in correspondence to the displacement quantity from the display position of the cursor 40 to the touch position and then the processing in step S90 is executed a plurality of times, so that along with the displacement quantity information indicating that the displacement quantity is 0, the button operation information is transmitted a plurality of times. In this manner, a configuration is adopted such that if the double tap operation has been performed, the same operation information as that transmitted in case that the double click operation is performed with a mouse is transmitted from the in-vehicle device 1 to the portable terminal 2. Therefore, the double tap operation can be recognized as the double click operation at the portable terminal 2.

(5) If the touch position has been changed while the touch operation was going on, the control unit 10 transmits, in step S60, displacement quantity information in correspondence to the displacement quantity from the display position to the touch position of the cursor 40 and then, if the touch operation is going on, it transmits the button operation information along with the displacement quantity information indicating the displacement quantity in correspondence to the change in the touch position (step S160). In addition, after the touch operation is completed, it transmits the displacement quantity information indicating that the displacement quantity is 0 (step S190). In this manner, a configuration is adopted such that if the flick operation has been performed, the same operation information as that transmitted in case that the drag-and-drop operation is performed with a mouse is transmitted from the in-vehicle device 1 to the portable terminal 2. Therefore, the flick operation can be recognized as the drag-and-drop operation at the portable terminal 2.

(6) If the touch operation is continued for a predetermined period of time or longer with the touch position being unchanged, the control unit 10 transmits the displacement quantity information in correspondence to the displacement quantity from the display position of the cursor 40 to the touch position and thereafter, if the touch operation is going on, the control unit 10 transmits the button operation information along with the displacement quantity information indicating that the displacement quantity is 0 (step S210). In this manner, a configuration is adopted such that if the press-and-hold click operation has been performed, the same operation information as that transmitted in case that the press-and-hold click operation is performed with the mouse being unmoved is transmitted from the in-vehicle device 1 to the portable terminal 2. Therefore, the press-and-hold operation can be recognized as the press-and-hold click operation at the portable terminal 2.

(7) The control unit 10 is configured to transmit displacement quantity information by using the HID packet, which is a communication format for a mouse in Bluetooth via the short-range wireless communication interface unit 15 in steps S60, S90, S120, S160, S190 and S210. Through these measures, the transmission of the displacement quantity information can be achieved readily and with certainty by using the existing communication format.

(8) The in-vehicle device 1 receives video information of the screen including cursor 40 from the portable terminal 2 and based upon the received video information brings up on display the screen on the display unit 11, which is a touch panel. Then, the in-vehicle device 1 detects the touch position specified through the touch operation by the user with the operation unit 12 that constitutes the touch panel together with the display unit 11. In addition, the in-vehicle device 1 receives the resolution information relative to the display unit 21 from the portable terminal 2 by using the short-range wireless communication interface unit 15 through the processing by the control unit 10 (step S10) and based upon the resolution information and the resolution of the display unit 11 stored in the memory unit 14 in advance, calculates conversion coefficients Xs/Xv and Ys/Yv that suit the ratio of the resolution of the display unit 21 to the resolution of the display unit 11 (step S20). Then, it calculates the displacement quantities Px and Py, which are displacement quantities from the display position of the cursor 40 to the touch position (step S40) and based upon the conversion coefficients Xs/Xv and Ys/Yv, respectively, calculated in step S20, it converts the calculated displacement quantities Px and Py to the displacement quantities Qx and Qy, respectively, on the display unit 21 (step S50). It transmits the displacement quantity information indicating the thus converted displacement quantities Qx and Qy to the portable terminal 2 (step S60). Through these measures, when the display screen of the portable terminal 2 in which touch panel operation is adopted is brought up on display at the in-vehicle device 1, the portable terminal 2 can be appropriately operated through the in-vehicle device 1 even if the resolution of the display unit 11 at the in-vehicle device 1 and the resolution of the display unit 21 at the portable terminal 2 are different from each other.

(9) The control unit 10, in step S20, calculates the conversion coefficients Xs/Xv and Ys/Yv for the transverse direction (X direction) and the longitudinal direction (Y direction), respectively, relative to the display unit 11. In addition, in step S40, it calculates the displacement quantities Px and Py from the display position of the cursor 40 to the touch position relative to the transverse direction (X direction) and the longitudinal direction (Y direction), respectively, of the display unit 11. In step S50, it converts the displacement quantity Px relative to the transverse direction of the display unit 11 into the displacement quantity Qx in the transverse direction of the display unit 21 by using the conversion coefficient Xs/Xv in the transverse direction, and also it converts the displacement quantity Py relative to the longitudinal direction of the display unit 21 into the displacement quantity Qy in the longitudinal direction of the display unit 21 by using the conversion coefficient Ys/Yv in the longitudinal direction of the display unit 21. With these measures, the displacement quantities Qx and Qy after the conversion can be accurately obtained according to the resolutions in the transverse direction and the longitudinal direction of the display unit 11 and the display unit 21, respectively.

(10) The in-vehicle device 1 receives the video information relative to a specific screen including the cursor 40 brought up on display at the predetermined reference position 42 from the portable terminal 2 via the video/audio signal input unit 16 and based upon the video information, it brings up on display the screen, which is the same as the specific screen and on which the cursor 40 is brought up on display at the predetermined reference position 41, at the display unit 11 in the form of a touch panel. Then, it causes the touch position specified through the touch operation by the user to be detected via the operation unit 12, which constitutes the touch panel together with the display unit 11. On this occasion, through the processing by the control unit 10, the displacement quantity information in correspondence to the displacement quantity from the display position of the cursor 40 to the touch position is transmitted to the portable terminal 2 via the short-range wireless communication interface unit 15 (step S60). Through these measures, the video information relative to the screen showing that the cursor 40 has been displaced to the touch position is received from the portable terminal 2 and the received video information is brought up on display at the display unit 11. In addition, after the touch operation is completed, the displacement quantity information indicating a maximal displacement quantity is transmitted to the portable terminal 2 (step S120) to thereby cause the display position of the cursor 40 to be returned to the original reference position 41. Through these measures, even when the display screen of the portable terminal 2, in which the touch panel operation is adopted, is brought up on display at the in-vehicle device 1 and an error in the cursor position after the displacement may occur due to a difference in resolution between the display unit 11 at the in-vehicle device 1 and the display unit 21 at the portable terminal 2, the portable terminal 2 is enabled to be appropriately operated through the in-vehicle device 1 without accumulating the error.

(11) The control unit 10, in step S120, transmits to the portable terminal 2 the displacement quantity information indicating a predetermined maximal displacement quantity for each of the transverse direction (X direction) and the longitudinal direction (Y direction) of the display unit 11 after the touch operation is completed to thereby cause the display position of the cursor 40 to be returned to the original reference position 41. As a result, the display position of the cursor 40 is enabled to be returned to the reference position 41 with certainty regardless of the touch position specified through the last touch operation.

(12) Since a configuration is adopted in which the point of indication of the cursor 40 is located at the left upper end thereof and the reference position 41 is located at the right lower end of the display unit 11, a most part of the cursor 40 is enabled to be located outside the screen display of the display unit 11 when no touch operation is performed, so that the cursor 40 will not be unpleasant to the eye of the user.

(13) The in-vehicle device 1 receives an image from the portable terminal 2 through the video/audio input unit 16 and brings up the received image on the display unit 11 in the form of a touch panel. Then, the in-vehicle device 1 detects the touch position specified through the touch operation by the user via the operation unit 12 that constitutes the touch panel together with the display unit 11. On this occasion, the in-vehicle device 1 transmits, through the processing by the control unit 10, the displacement quantity information in correspondence to the displacement quantity from the display position of the cursor 40 to the touch position via the short-range wireless communication interface unit 15 (step S60). In response thereto, it receives the video information transmitted from the portable terminal 2 and brings up the received video information on display at the display unit 11. As a result, in response to the touch operation, it causes the cursor 40 brought up on display at the reference position 41, which is located at the outer periphery of the display unit 11 as shown in FIG. 4(a), to be displaced to the touch position 43 as shown in FIG. 4(b). In addition, after the touch operation is completed, the displacement quantity information indicating the maximal displacement quantity is transmitted to the portable terminal 2 (step S120) to thereby cause the display position of the cursor 40 to be returned to the original reference position 41. Through these measures, when the display screen of the portable terminal 2, in which the touch panel operation is adopted, is brought up on display at the in-vehicle device 1 and no touch operation is performed, the portable terminal 2 is enabled to be operated through the in-vehicle device 1 so that the cursor 40 will not be unpleasant to the eye of the user.

It is to be noted that the embodiment explained earlier relates to an example in which when no touch operation is performed, the cursor 40 is brought up on display at the reference positions 41 and 42 each located at the right lower ends of the display units 11 and 12, respectively. However, the cursor 40 may be brought up on display at a position other than the above reference positions. As far as the outer peripheries of the display units 11 and 12 are concerned, the cursor 40 is enabled to be arranged so that it will not be unpleasant to the eye of the user in the same manner as that in the embodiment described above even if the cursor 40 is brought up on display at any desired position when no touch operation is performed. On this occasion, in order to make the cursor 40 as less eye-catching as possible, it is preferred to bring it up on display at a position that is defined as a reference position located at the end of the display unit 11 in an orientation opposite to the orientation of from the central point of the cursor 40 to the point of indication. In the example shown in FIGS. 4(*a*) and 4(*b*), since the point of indication of the cursor 40 is present at the left upper end, the reference position 41 is set at the right lower end in an orientation opposite to the orientation toward the left upper orientation, which is directed from the central point of the cursor 40 to the point of indication.

In addition, the embodiment explained earlier relates to an example, in which after completion of the touch operation in step S120 shown in FIG. 5, the displacement quantity information indicating the predetermined maximal displacement quantity for each of the transverse direction (X direction) and the longitudinal direction (Y direction) of the display unit 11 is transmitted to the portable terminal 2 to cause the display position of the cursor 40 to be returned to the original reference position 41. Assuming that the left upper end of the display unit 11 is defined to be a start point, the right direction is defined to be a positive orientation of the X direction and the lower direction is defined to be a positive orientation of the Y direction, this measure is effective for causing the cursor 40 to be returned to the reference position 41 at the right lower end of the display unit 11. However, this will not be true if the position of the start point and the definitions of positive orientations of X and Y directions are changed. For instance, assuming that the right lower end of the display unit 11 is defined to be a start point, the left direction is defined to be the positive orientation of the X direction, and the upper direction is defined to be the positive orientation of the Y direction, in order to cause the cursor 40 to be returned to the reference position 41 at the right lower end of the display unit 11, it is necessary to transmit the displacement quantity information indicating a predetermined minimal displacement quantity for each of the X direction and the Y direction of the display unit 11. In other words, in step S120, after completion of the touch operation, the displacement quantity information indicating the predetermined maximal displacement quantity or the predetermined minimal displacement quantity in correspondence to the position of the start point and the definitions of the positive orientations of the X and Y directions, respectively, relative to the transverse direction (X direction) and the longitudinal direction (Y direction) may be transmitted to the portable terminal 2 in order to cause the display position of the cursor 40 to be returned to the reference position 41. It is to be noted that the same is true when the right lower end of the display 11 is taken as the reference position.

In the embodiment described above, an example has been explained in which the transmission of video signals and audio signals from the portable terminal 2 to the in-vehicle device 1 is enabled by connecting the in-vehicle device 1 and the portable terminal 2 with each other via the video/audio cable 3. In addition, an example has been explained in which the in-vehicle device 1 and the portable terminal 2 communicate with each other through short-range wireless communication carried out in compliance with a predetermined communication standard such as Bluetooth in the embodiment described above. However, the present invention may be achieved in conjunction with another communication method or another signal transmission method. For instance, video signals and audio signals originating from the portable terminal 2 may be transmitted to the in-vehicle device 1 through wireless communication. In addition, communication between the in-vehicle device 1 and the portable terminal 2 may be carried out through wired communication such as USB communication. On this occasion, in steps S60, S90, S120, S160, S190 and S210 in FIG. 5, the displacement quantity information and the button operation information can be transmitted from the in-vehicle device 1 to the portable terminal 2 by using the communication format for USB or the like instead of the HID packet described earlier. Any communication method may be adopted in the present invention as long as it allows the in-vehicle device 1 and the portable terminal 2 to exchange necessary signals and information.

In the embodiment described above, various types of vehicle information output from the vehicle other than the vehicle speed signal and the parking signal may also be obtained by the in-vehicle device 1. Such vehicle information taken into the in-vehicle device 1 may then be utilized in the processing executed in the in-vehicle device 1, or it may be output from the in-vehicle device 1 to the portable terminal 2 and used in the processing executed at the portable terminal 2. For instance, a configuration may be adopted in which a start-up condition in correspondence to such vehicle information may be set in advance for each application and when the vehicle information indicating a specific start-up condition is output from the vehicle, the corresponding application may be started up automatically at the portable terminal 2. On this occasion, the information indicating the start-up conditions for the individual applications may be transmitted from the portable terminal 2 to the in-vehicle device 1 and a decision as to whether or not a start-up condition exists may be made in the in-vehicle device 1 based upon the vehicle information. As an alternative, the vehicle information may be transmitted from the in-vehicle device 1 to the portable terminal 2 and the decision as to whether or not a start-up condition exists may be made at the portable terminal 2 based upon the vehicle information. Such use of the vehicle information makes it possible for the portable terminal 2 to automatically start-up an application that, for instance, enables a search for gas stations located near the current position when vehicle information, indicating that the quantity of remaining fuel in the vehicle has become less than a predetermined quantity, is output from the vehicle.

In the embodiment described above, the example is explained in which a touch panel is adopted as the display unit 11 of the in-vehicle device 1 and an image received from the portable terminal 2 is brought up on display at the display unit 11. However, the present invention is not limited to this example. The present invention can be adopted in any display device as far as it can be connected with an information terminal and brings up on display an image received from the information terminal on a touch panel.

The embodiment and variations thereof described above simply represent examples and the present invention is in no way limited to these examples as long as the features characterizing the present invention remain intact. In addition, the embodiment and variations thereof described above may be adopted in any combination to realize a combination of advantages.

The disclosure of the following priority application is herein incorporated by reference: Japanese Patent Application No. 2012-130929 (filed on Jun. 8, 2012).

REFERENCE SIGNS LIST

1: in-vehicle device, 2: portable terminal, 3: video/audio cable, 10: control unit, 11: display unit, 12: operation unit, 13: audio output unit, 14: memory unit, 15: short-range wireless communication interface unit, 16: video/audio signal input unit, 20: control unit, 21: display unit, 22: operation unit, 23: audio output unit, 24: memory unit, 25: short-range wireless communication interface unit, 26: video/audio signal output unit, 27: wireless communication unit, 28: GPS receiver unit.

The invention claimed is:

1. A display device that is to be connected with an information terminal, comprising:
  a video reception unit that receives video information about a screen including a cursor from the information terminal;
  a touch panel that brings up on display the screen based upon the video information received by the video reception unit and detects a touch position specified by a touch operation;
  a control unit that calculates displacement quantity between the touch position and a reference position of the touch panel and that converts the calculated displacement quantity based upon resolution information of the screen; and
  a transmission unit that transmits, to the information terminal, displacement quantity information indicating the displacement quantity that has been converted by the control unit,
  wherein if the touch operation is completed within a predetermined period of time with the touch position being unchanged, the transmission unit transmits, after having transmitted the displacement quantity information in correspondence to the quantity of displacement from the display position of the cursor to the touch position, the button operation information along with the displacement quantity information indicating that the quantity of displacement is 0.

2. A display device according to claim 1, wherein the transmission unit additionally transmits button operation information indicating that a predetermined button operation has been performed to the information terminal.

3. A display device according to claim 2, wherein if the touch operation is performed a plurality of times with the touch position being unchanged, the transmission unit transmits, after having transmitted the displacement quantity information in correspondence to the quantity of displacement from the display position of the cursor to the touch position, the button operation information a plurality of times along with the displacement quantity information indicating that the quantity of displacement is 0.

4. A display device according to claim 2, wherein if the touch position is changed while the touch operation is going on, the transmission unit transmits, after having transmitted the displacement quantity information in correspondence to the quantity of displacement from the display position of the cursor to the touch position, the button operation information along with the displacement quantity information indicating a quantity of displacement in correspondence to a change in the touch position while the touch operation is going on, and after the touch operation is completed, transmits the displacement quantity information indicating that the quantity of displacement is 0.

5. A display device according to claim 2, wherein if the touch operation is going on for a predetermined period of time or longer with the touch position being unchanged, the transmission unit transmits, after having transmitted the displacement quantity information in correspondence to the quantity of displacement from the display position of the cursor to the touch position, the button operation information along with the displacement quantity information indicating that the quantity of displacement is 0 while the touch operation is going on.

6. A display device according to claim 1, wherein the transmission unit transmits the displacement quantity information by using a communication format for a mouse in Bluetooth or USB.

\* \* \* \* \*